United States Patent
Hibshman, II

(10) Patent No.: US 8,209,951 B2
(45) Date of Patent: Jul. 3, 2012

(54) POWER GENERATION SYSTEM HAVING AN EXHAUST ATTEMPERATING DEVICE

(75) Inventor: Joell Randolph Hibshman, II, Greer, SC (US)

(73) Assignee: General Electric Company, Schenectady, NY (US)

( * ) Notice: Subject to any disclaimer, the term of this patent is extended or adjusted under 35 U.S.C. 154(b) by 1581 days.

(21) Appl. No.: 11/848,761

(22) Filed: Aug. 31, 2007

(65) Prior Publication Data
US 2011/0000220 A1 Jan. 6, 2011

(51) Int. Cl.
*F02C 6/00* (2006.01)
*F02C 7/08* (2006.01)

(52) U.S. Cl. ...... 60/39.182; 60/39.5

(58) Field of Classification Search ....... 60/39.182, 60/39.5, 264; 122/7 R, 7 B
See application file for complete search history.

(56) References Cited

U.S. PATENT DOCUMENTS

| | | | |
|---|---|---|---|
| 3,525,474 A * | 8/1970 | von Ohain et al. | 239/265.17 |
| 4,555,902 A | 12/1985 | Pilarczyk | |
| 5,632,143 A | 5/1997 | Fisher et al. | |
| 5,699,965 A * | 12/1997 | Amelio | 239/127.3 |
| 5,881,551 A * | 3/1999 | Dang | 60/39.182 |
| 6,442,941 B1 | 9/2002 | Anand et al. | |
| 6,543,234 B2 | 4/2003 | Anand et al. | |
| 6,782,703 B2 | 8/2004 | Dovali-Solis | |

* cited by examiner

*Primary Examiner* — Louis Casaregola
(74) *Attorney, Agent, or Firm* — Cantor Colburn LLP

(57) ABSTRACT

A power generation system having an exhaust gas attemperating device and method for controlling a temperature of exhaust gases is provided. The exhaust gas attemperating device includes a first conduit and a venturi member. The first conduit is configured to receive at least a portion of exhaust gases from a gas turbine. The venturi member is disposed in the first conduit and defines a flow path therethrough for receiving the exhaust gases in the first conduit. The first conduit and the venturi member have an aperture extending therethrough communicating with the flow path, such that the exhaust gases flowing through the flow path draws ambient air through the aperture into the flow path for reducing a temperature of the exhaust gases flowing through the first conduit.

11 Claims, 7 Drawing Sheets

POWER GENERATION SYSTEM HAVING AN EXHAUST ATTEMPERATING DEVICE

BACKGROUND OF THE INVENTION

A combined cycle power plant ("CCPP") includes a gas turbine, a heat recovery steam generator ("HRSG") and a steam turbine. The gas turbine includes a turbine configured to produce a rotational power output in response to an expansion of exhaust gases. The HRSG is configured to receive the exhaust gases from the gas turbine and generate steam from heat of the exhaust gases. The steam turbine is configured to rotate in response to an expansion of the steam from the HRSG.

The steam turbine is configured to operate with acceptable thermal stresses when a difference between a temperature of the steam entering the steam turbine and a temperature of the metal components of steam turbine is less than a predetermined temperature threshold. The temperature difference can exceed the predetermined threshold, during a startup of the steam turbine with the gas turbine operating at full load. Accordingly, the CCPP has a startup period of time within which the gas turbine load is gradually increased in order to gradually increase the temperatures of the steam and steam turbine, such that the temperature difference between the steam and steam turbine does not exceed the threshold.

Accordingly, it is desirable to provide a power generation system having an exhaust attemperating device and a method of controlling a temperature of exhaust gases to reduce thermal stress of a steam turbine and reduce a startup time, emissions and fuel consumption of the power generation system.

BRIEF DESCRIPTION OF THE INVENTION

An exhaust gas attemperating device in accordance with an exemplary embodiment is provided. The device includes a first conduit configured to receive at least a portion of exhaust gases from a gas turbine. The device further includes a venturi member disposed in the first conduit. The venturi member defines a flow path therethrough for receiving the exhaust gases in the first conduit. The first conduit and the venturi member have an aperture extending therethrough communicating with the flow path, such that the exhaust gases flowing through the flow path draws ambient air through the aperture into the flow path for reducing a temperature of the exhaust gases flowing through the first conduit.

A system for controlling a temperature of exhaust gases from a gas turbine in accordance with another exemplary embodiment is provided. The system includes an exhaust gas attemperating device having a first conduit and a venturi member disposed in the first conduit. The first conduit is configured to receive at least a portion of exhaust gases from the gas turbine. The venturi member defines a flow path therethrough for receiving the exhaust gases in the first conduit. The first conduit and the venturi member have an aperture extending therethrough communicating with the flow path, such that the exhaust gases flowing through the flow path draws ambient air through the aperture into the flow path for reducing a temperature of the exhaust gases flowing through the first conduit. The system further includes an intake duct is in fluid communication with the aperture. The system further includes a throttle valve coupled to the intake duct. The throttle valve is configured to move between an open operational position and a closed operational position, such that the ambient air passes through the intake duct and the aperture into the flow path when the throttle valve is moved to the open operational position, and the throttle valve blocks the intake duct when the throttle valve is moved to the closed operational position. The system further includes a first actuator coupled to the throttle valve. The first actuator is configured to move the throttle valve between the open operational position and the closed operational position. The system further includes a first temperature sensor configured to generate a first signal indicative of a temperature of steam passing from a heat recovery steam generator to a steam turbine. The heat recovery steam generator is configured to receive the exhaust gases from the gas turbine and generate steam from heat of the exhaust gases. The system further includes a second temperature sensor coupled to a portion of the steam turbine. The second temperature sensor is configured to generate a second signal indicative of a temperature of the portion of the steam turbine. The system further includes a controller configured to receive the first and second signals respectively from the first and second temperature sensors. The controller is further configured to generate a temperature difference value indicative of a temperature difference based on the first and second signals. The controller is further configured to induce the first actuator to move the throttle valve to the open operational position when the controller determines that the temperature difference value is greater than a first threshold value. The controller is further configured to induce the first actuator to move the throttle valve to the closed operational position when the controller determines that the temperature difference value is less than a second threshold value, the second threshold value being less than the first threshold value.

A power generation system in accordance with another exemplary embodiment is provided. The power generation system includes a gas turbine configured to burn a mixture of fuel and compressed air for producing exhaust gases. The power generation system further includes an exhaust gas attemperating device configured to receive the exhaust gases from the gas turbine. The exhaust gas attemperating device includes a first conduit and a venturi member disposed in the first conduit. The first conduit is configured to receive at least a portion of the exhaust gases from the gas turbine. The venturi member defines a flow path therethrough for receiving the exhaust gases in the first conduit. The first conduit and the venturi member have an aperture extending therethrough communicating with the flow path, such that the exhaust gases flowing through the flow path draws ambient air through the aperture into the flow path for reducing a temperature of the exhaust gases flowing through the first conduit. The power generation system further includes a heat recovery steam generator configured to receive the exhaust gases from the exhaust gas attemperating device and generate steam from heat of the exhaust gases. The power generation system further includes a steam turbine configured to receive the steam from the heat recovery steam generator and rotate in response to an expansion of the steam.

DETAILED DESCRIPTION OF THE INVENTION

The present application is directed to an exhaust gas attemperating device for decreasing thermal stress in a steam turbine and reducing a startup time of a CCPP. In these embodiments, the exhaust gas attemperating device functions to control a difference between a temperature of steam entering a steam turbine and a temperature of the steam turbine, within a predetermined range. However, it is contemplated that the exhaust gas attemperating device can be used in various other suitable systems as desired.

Figure 1:
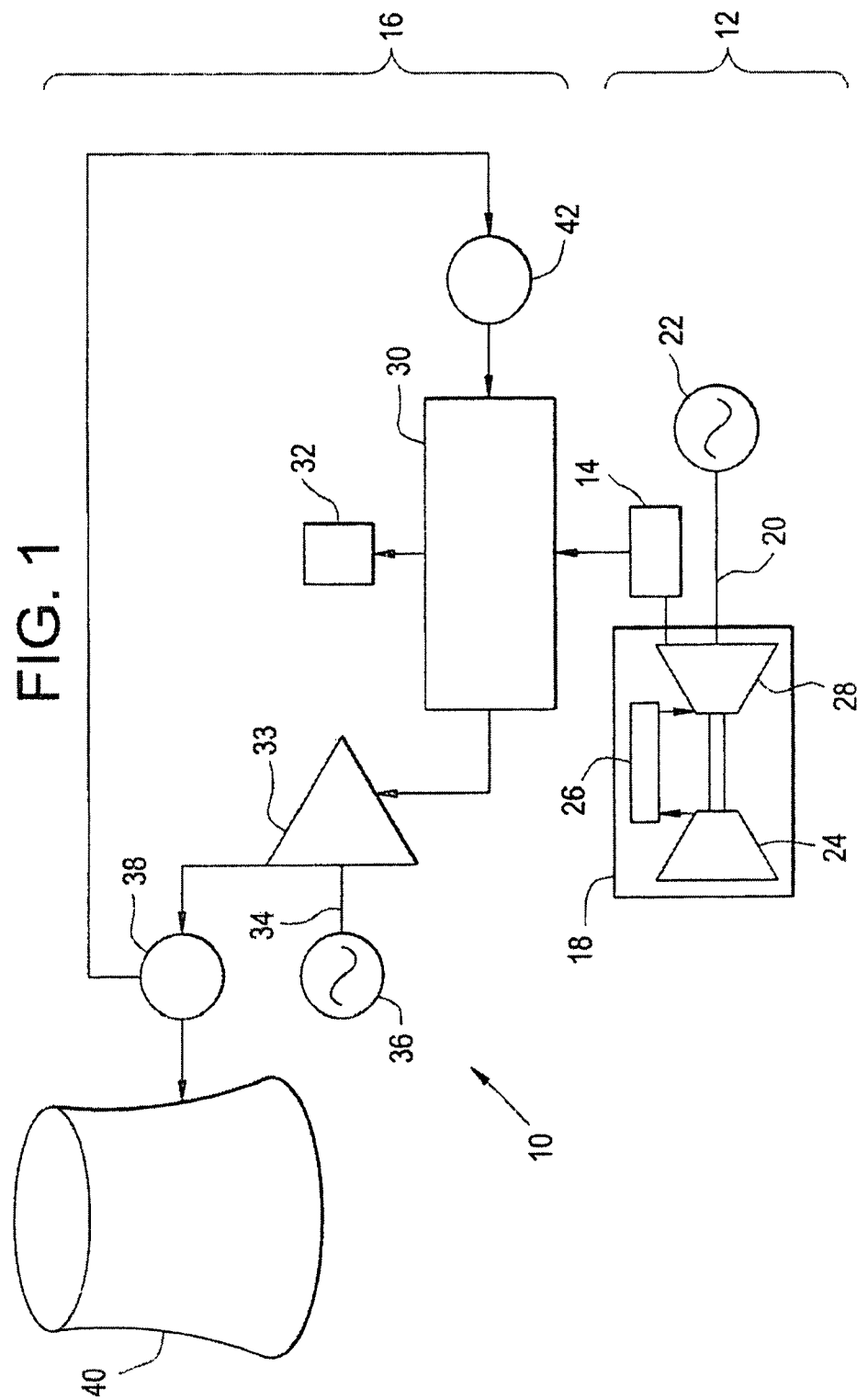
FIG. 1 is a schematic of a power generation system having an exhaust gas attemperating device, in accordance with an exemplary embodiment.

Referring to FIG. 1, a CCPP or power generation system 10 includes a gas turbine generator 12, an exhaust gas attemperating device 14 and a steam turbine generator 16. The gas turbine generator 12 is configured to generate electricity and produce exhaust gases. The exhaust gas attemperating device 14 is configured to receive the exhaust gases from the gas turbine generator 12 and control the temperature of the exhaust gases for reducing a startup time of the CCPP 10 and decreasing thermal stress in the steam turbine generator 16. The steam turbine generator 16 is configured to receive the exhaust gases from the exhaust gas attemperating device 14 and generate additional electricity from waste heat of the exhaust gases.

The gas turbine generator 12 includes a gas turbine 18, a first output shaft 20 and a first electrical generator 22. The gas turbine 18 has a compressor 24, a combustor 26 and a turbine 28. The compressor 24 is configured to compress an inflow of air. The combustor 26 is configured to receive the compressed air from the compressor 24 and combust a mixture of the compressed air and fuel, which produces high pressure, high temperature exhaust gases. The turbine 28 is configured to receive the exhaust gases from the combustor 26 and rotate in response to an expansion of the exhaust gases. The turbine 28 is operably connected to the first electrical generator 22 by the first output shaft 20 for providing rotational power to the first electrical generator 22 and generating electricity. The turbine 28 is further configured to pass the exhaust gases to the exhaust gas attemperating device 14 for controlling the temperature of the exhaust gases as detailed below.

The steam turbine generator 16 includes an HRSG 30 and an exhaust stack 32. The HRSG 30 is configured to receive the exhaust gases from the exhaust gas attemperating device 14 and generate steam from the waste heat of the exhaust gases. The exhaust stack 32 is configured to pass the exhaust gases from the HRSG 30 to the atmosphere.

The steam turbine generator 16 further includes a steam turbine 33, a second output shaft 34, a second electrical generator 36, a condenser 38, a cooling tower 40 and a pump 42. The steam turbine 33 is configured to receive the steam from the HRSG 30 and rotate in response to an expansion of the steam. The steam turbine 33 is operably connected to the second electrical generator 36 by the second output shaft 34 for providing rotational power to the second electrical generator 36 and generating electricity. The condenser 38 is configured to receive the steam from the steam turbine 33 and condense the steam into water. In particular, the condenser 38 is configured to receive cooling water from the cooling tower 40 and transfer heat from the steam to the cooling water for condensing the steam into water. It is contemplated that the condenser 38 can instead be configured to transfer heat to cooling water from a lake, river, sea or other suitable non-limiting examples. The pump 42 is configured to pump water from the condenser 38 into the HRSG 30.

Figure 2:
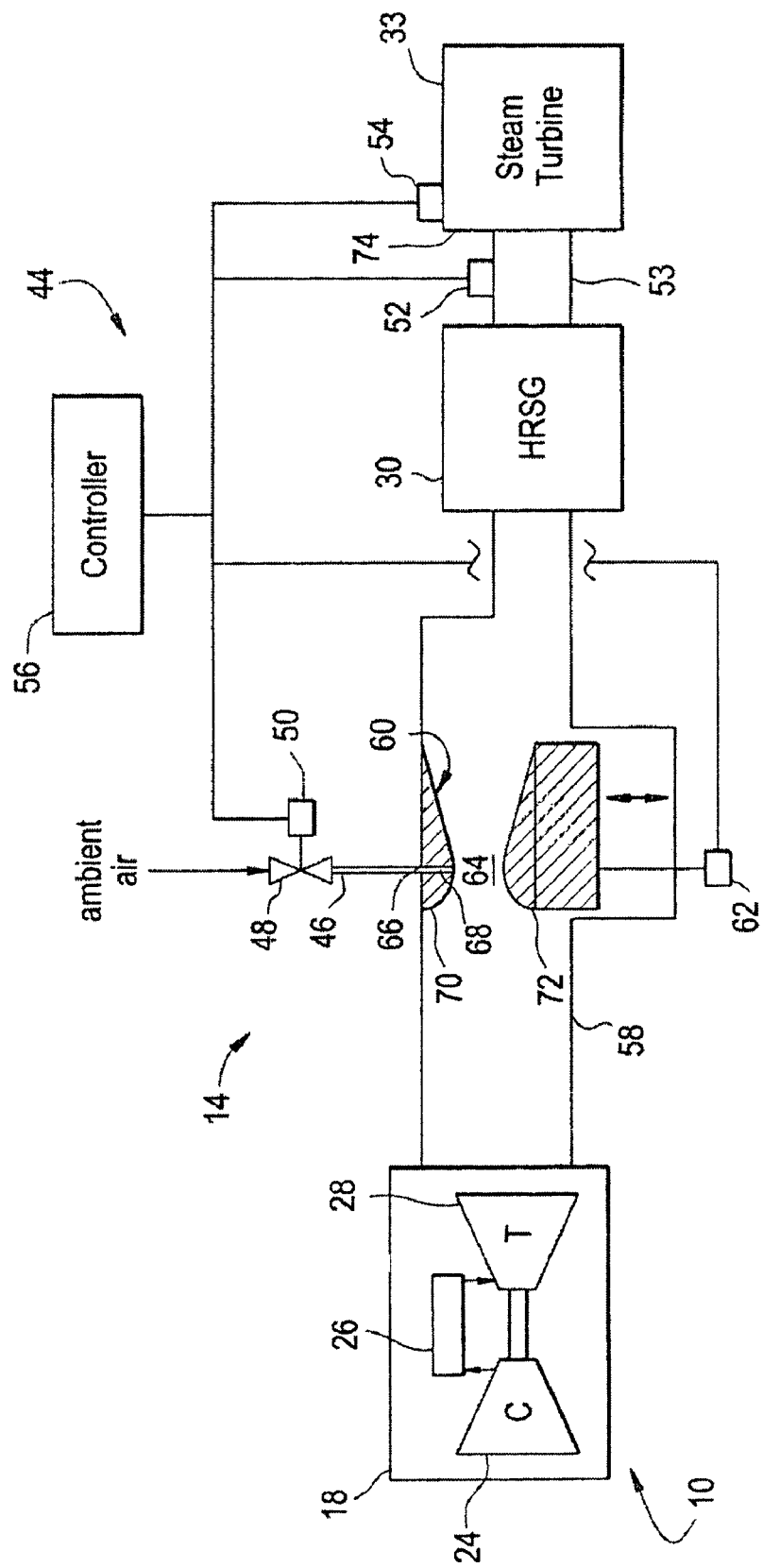
FIG. 2 is a schematic of a system for controlling a temperature of exhaust gases, utilizing the exhaust gas attemperating device of FIG. 1, in accordance with another exemplary embodiment.

Referring to FIG. 2, the power generation system 10 further includes a system 44 for controlling a temperature of the exhaust gases. The system 44 includes the exhaust gas attemperating device 14, an intake duct 46, a throttle valve 48, a first actuator 50, a first temperature sensor 52, a second temperature sensor 54 and a controller 56.

The exhaust gas attemperating device 14 has a first conduit 58, a venturi member 60 and a venturi actuator 62. The first conduit 58 is configured to receive at least a portion of exhaust gases from the gas turbine 18. The venturi member 60 is disposed in the first conduit 58 and defines a flow path 64 therethrough for receiving the exhaust gases in the first conduit 58. The first conduit 58 and the venturi member 60 respectively have apertures 66, 68 extending therethrough communicating with the flow path 64, such that the exhaust gases flowing through the flow path 64 draws ambient air through the apertures 66, 68 into the flow path 64 for reducing a temperature of the exhaust gases flowing through the first conduit 58.

The venturi member 60 includes a stationary portion 70 and a movable portion 72 operably coupled to the stationary portion 70. The stationary portion 70 is mounted to the first conduit 58. The movable portion 72 is configured to move between a dilated position and a constricted position, such that the flow path 64 has a first cross-sectional area when the movable portion 72 is moved to the dilated position, and the flow path 64 has a second cross-sectional area when the movable portion 72 is moved to the constricted position. The second cross-sectional area is less than the first cross-sectional area, such that more ambient air is drawn into the flow path 64 when the movable portion 72 is moved to the constricted position.

The venturi actuator 62 is coupled to the movable portion 72 of the venturi member 60. The venturi actuator 62 is configured to move the movable portion 72 between the constricted and dilated positions, respectively in response to second and fourth actuation signals received from the controller 56 as detailed below.

The intake duct 46 is in fluid communication with the apertures 66, 68 and the throttle valve 48 is coupled to the intake duct 46. The throttle valve 48 is configured to move between an open operational position and a closed operational position. The ambient air passes through the intake duct 46 and the apertures 66, 68 into the flow path 64 when the throttle valve 48 is moved to the open operational position. Further, the throttle valve 48 blocks the intake duct 46 when the throttle valve 48 is moved to the closed operational position.

The first actuator 50 is coupled to the throttle valve 48. The first actuator 50 is configured to move the throttle valve 48 between the open and closed operational positions, respectively in response to first and third actuation signals received from the controller 56 as detailed below.

The first temperature sensor 52 is coupled to a transition duct 53 extending between the HRSG 30 and the steam turbine 33. The first temperature sensor 52 is configured to generate a first signal indicative of a temperature of steam passing from the HRSG 30 to the steam turbine 33. The first signal is received by the controller 56.

The second temperature sensor 54 is coupled to a portion 74 of the steam turbine 33. The second temperature sensor 54 is configured to generate a second signal indicative of a temperature of the portion 74 of the steam turbine 33. The second signal is received by the controller 56.

The controller 56 is configured to receive the first and second signals from the first and second temperature sensors 52, 54. The controller 56 is further configured to generate a temperature difference value indicative of a temperature difference based on the first and second signals. In particular, the temperature difference value is indicative of a difference between the temperature of the steam entering the steam turbine 33 and a temperature of the portion 74 of the steam turbine 33.

The controller 56 is further configured to generate first and second actuation signals when the controller 56 determines that the temperature difference value is greater than a first threshold value. The first threshold value is indicative of a temperature threshold, above which the steam turbine 33 begins to receive a thermally induced stress greater than a predetermined level of acceptable stress. The first actuation signal induces the first actuator 50 to move the throttle valve 48 to the open operational position, and the second actuation signal induces the venturi actuator 62 to move the movable portion 72 of the venturi member 60 to the constricted position. Accordingly, exhausts gases passing through the venturi member 60 draws ambient air through the intake duct 46 and into the flow path 64 in the first conduit 58, such that the ambient air decreases the temperature of the exhaust gases hence decreasing the temperature of the steam and thermal stress of the steam turbine 33.

The controller 56 is further configured to generate third and fourth actuation signals when the controller 56 determines that the temperature difference value is less than a second threshold value. The second threshold value is indicative of a temperature threshold, below which the steam turbine 33 operates at a lower load delaying the startup of the CCPP 10 and decreasing the generation of saleable electricity. The third actuation signal induces the first actuator 50 to move the throttle valve 48 to the closed operational position, and the fourth actuation signal induces the venturi actuator 62 to move the movable portion 72 of the venturi member 60 to the dilated position. Accordingly, the ambient air is not mixed with the exhaust gases for decreasing the temperature of the exhaust gases, such that the temperature of the steam that rolls the steam turbine 33 is increased.

The second threshold value is less than the first threshold value, such that there is a range of temperatures within which the throttle valve 48 and venturi member 60 remain in fixed positions.

Figure 3:
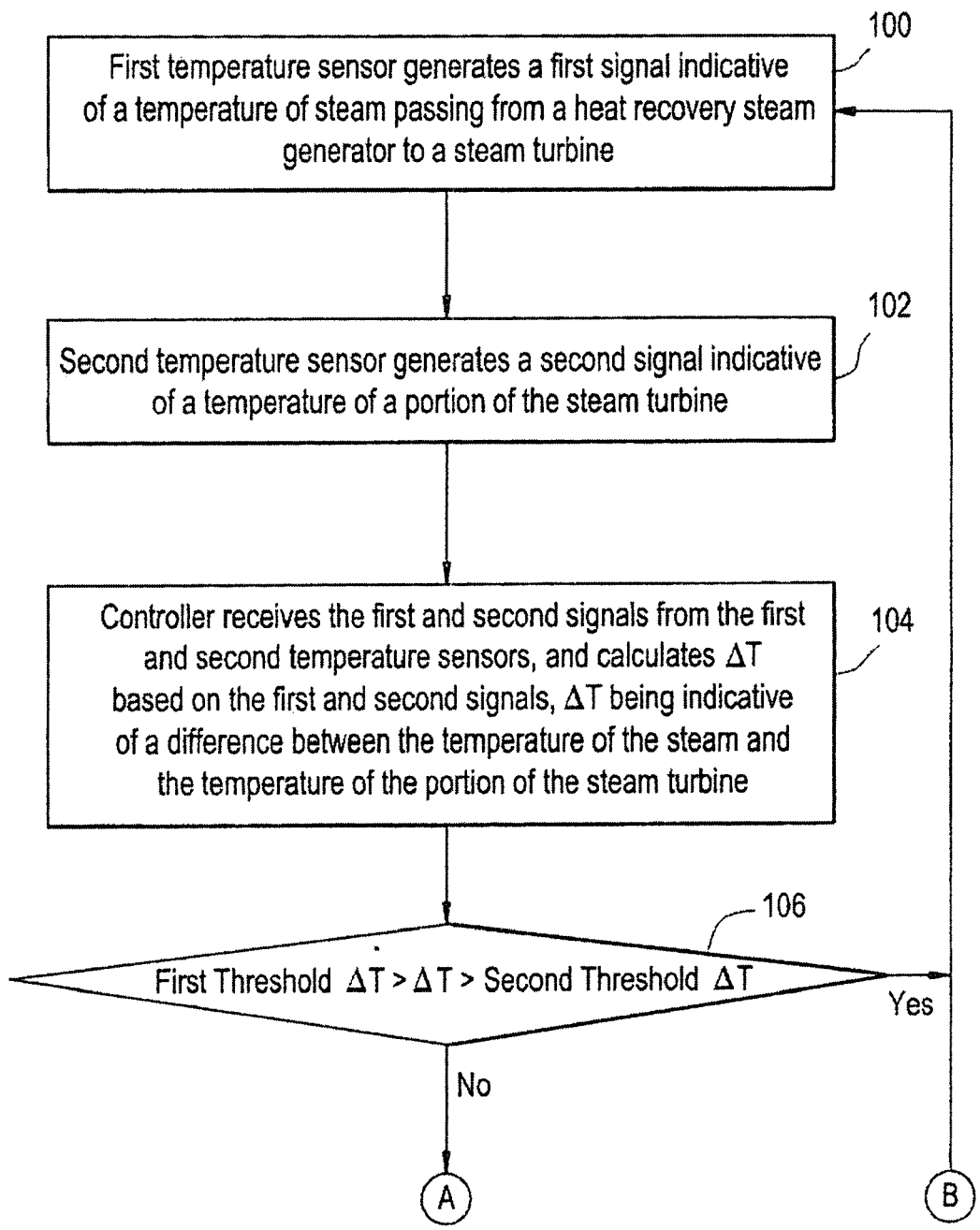
FIGS. 3 and 4 are a flowchart of a method of operating the system of FIG. 2, in accordance with another exemplary embodiment.
Figure 4:
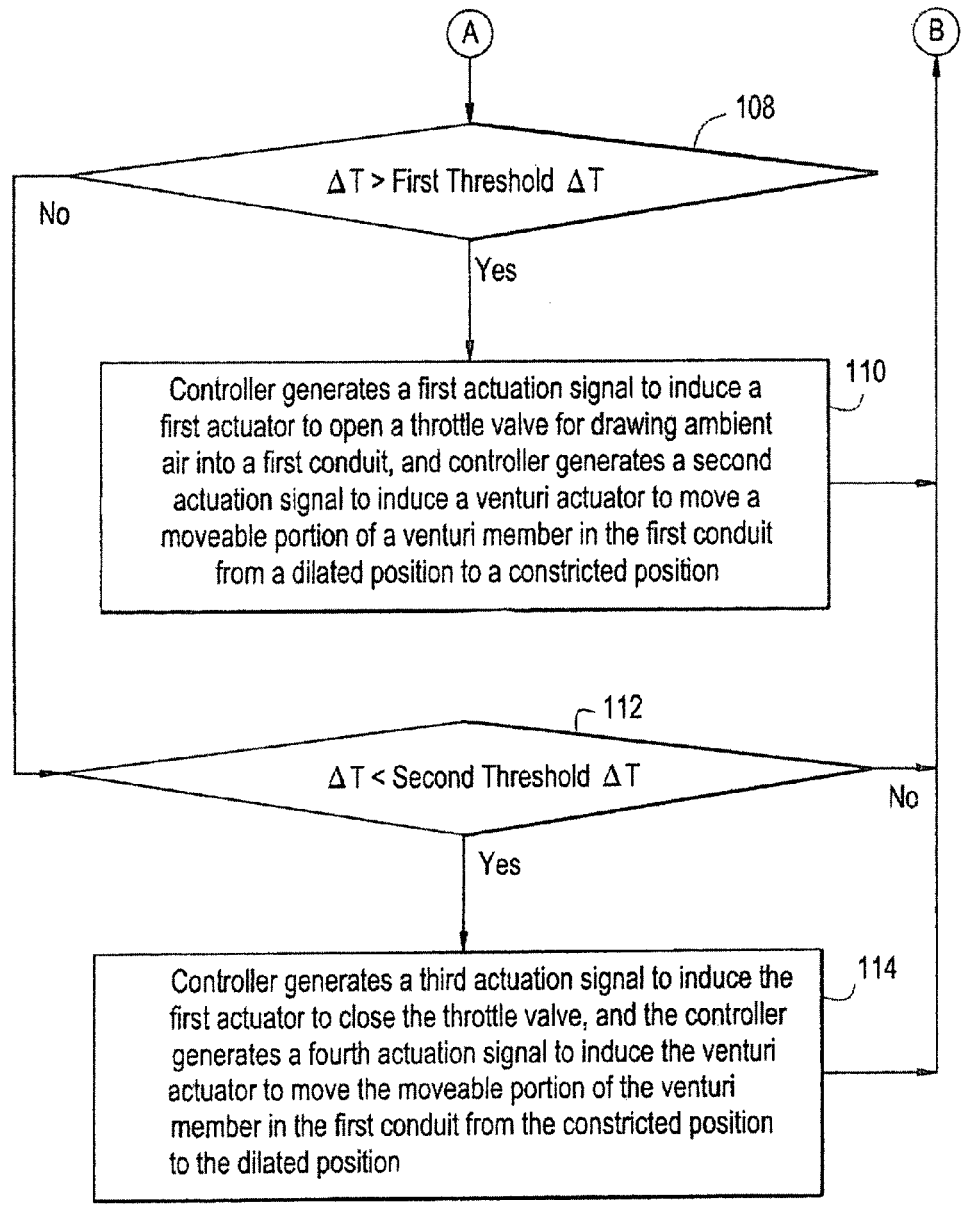

Referring to FIGS. 3 and 4, a flowchart of a method of operating the system 44 of FIG. 2 will now be explained. The system 44 is configured to control a temperature of exhaust gases for reducing a startup time of the CCPP 10 and reducing thermal stress on the steam turbine 33.

At step 100, the first temperature sensor 52 generates a first signal indicative of a temperature of steam passing from the HRSG 30 to the steam turbine 33.

Next at step 102, the second temperature sensor 54 generates a second signal indicative of a temperature of the portion 74 of the steam turbine 33.

Next at step 104, the controller 56 receives the first and second signals respectively from the first and second temperature sensors 52, 54. Further, the controller 56 calculates a temperature difference value based on the first and second signals. The temperature difference value is indicative of a difference between the temperature of the steam and the temperature of the portion 74 of the steam turbine 33.

Next at step 106, the controller 56 determines whether the temperature difference value is less than the first threshold value and greater than the second threshold value. If the value of step 106 equals "yes", then the method returns to step 100. However, if the value of step 106 equals "no", then the method proceeds to step 108.

At step 108, the controller 56 determines whether the temperature difference value is greater than the first threshold value. If the value of step 108 equals "yes", then the method proceeds to step 110.

At step 110, the controller 56 generates a first actuation signal to induce the first actuator 50 to move the throttle valve 48 to the open operational position for drawing ambient air into the first conduit 58. Further, the controller 56 generates a second actuation signal to induce the venturi actuator 62 to move the movable portion 72 of the venturi member 60 to the constricted position. Accordingly, the exhaust gases passing through the venturi member 60 draws ambient air through the intake duct 46 and into the flow path 64 in the first conduit 58 for decreasing the temperature of the exhaust gases. In this respect, the temperature of the steam is decreased, and the temperature difference between the steam and the steam turbine 33 does not produce a level of thermal stress on the steam turbine 33 that is greater than a predetermined level of acceptable thermal stress. The method then returns to step 100.

However, if at step 108 the controller 56 determines that the temperature difference value is not greater than the first threshold value, then the method proceeds to step 112.

At step 112, the controller 56 determines whether the temperature difference value is less than the second threshold value. If the value of step 112 equals "no", then the method returns to step 100. However, if the value of step 112 equals "yes", then the method proceeds to step 114.

At step 114, the controller 56 generates a third actuation signal to induce the first actuator 50 to move the throttle valve 48 to the closed operational position for blocking the intake duct 46. The controller 56 further generates a fourth actuation signal to induce the venturi actuator 62 to move the movable portion 72 of the venturi member 60 to the dilated position. Accordingly, the exhaust gases are not mixed with the ambient air and the temperature of the steam is increased. Then, the method returns to step 100.

Figure 5:
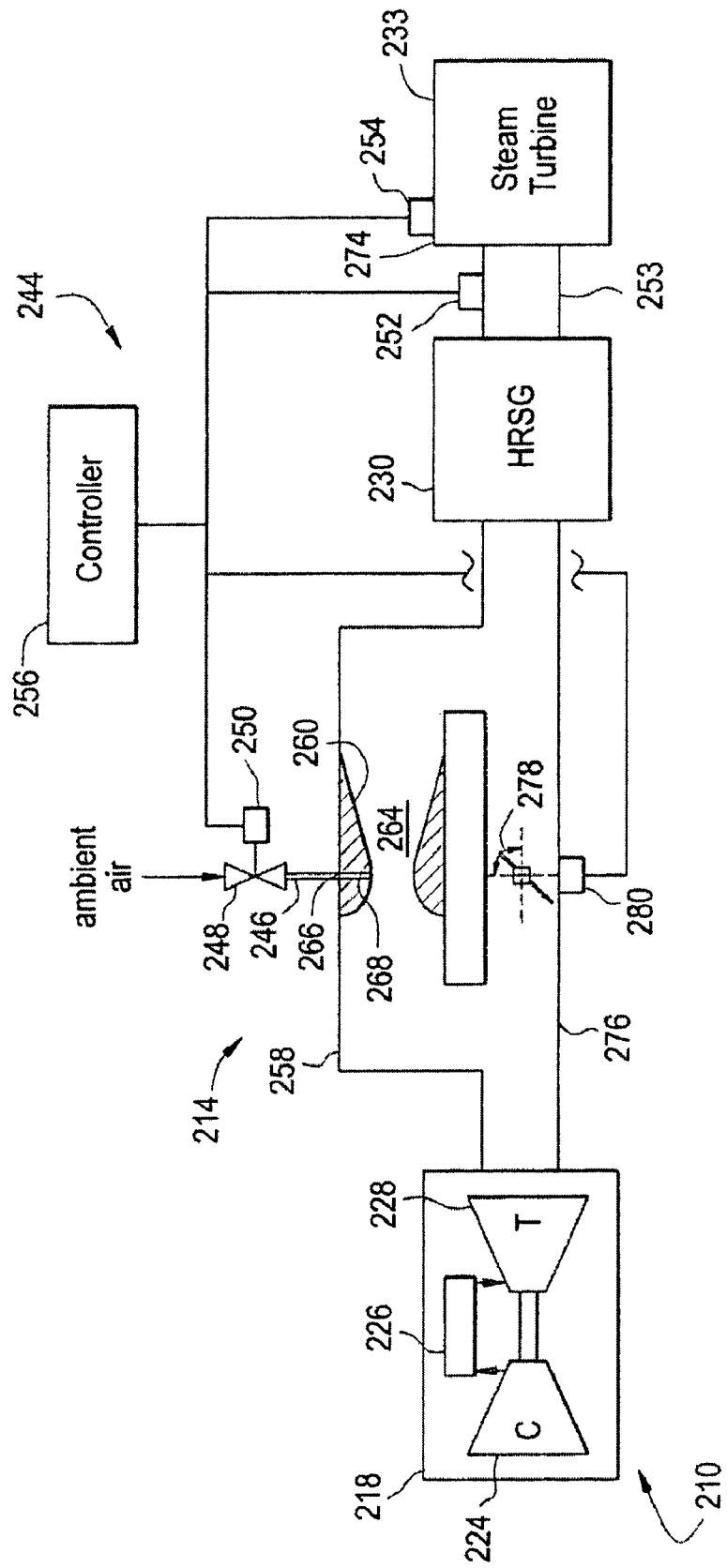
FIG. 5 is a schematic of a system for controlling a temperature of exhaust gases, in accordance with another exemplary embodiment.

Referring to FIG. 5, a CCPP or power generation system 210 having a system 244 with an exhaust gas attemperating device 214 in accordance with another exemplary embodiment is provided. The system 244 includes the exhaust gas attemperating device 214 with a first conduit 258 and a venturi member 260, and is substantially similar to the system 44 of FIG. 2 respectively having the exhaust gas attemperating device 14 with the first conduit 58 and the venturi member 60. However, the venturi member 260 does not have a movable portion but rather is an integral stationary device. In addition, the exhaust gas attemperating device 214 further includes a second conduit 276, a damper 278 and a second actuator 280.

The second conduit 276 is in parallel communication with the first conduit 258 between the gas turbine 218 and the HRSG 230. The second conduit 276 is configured to receive another portion of the exhaust gases from the gas turbine 218.

The damper 278 is disposed in the second conduit 276 and configured to move between an open operational position and a closed operational position. In particular, the portion of the exhaust gases passes through the second conduit 276 when the damper 278 is moved to the open operational position. Further, the damper 278 blocks the second conduit 276 when the damper 278 is moved to the closed operational position.

The second actuator 280 is coupled to the damper 278 and configured to move the damper 278 between the closed and open operational positions, respectively in response to second and fourth actuation signals received from the controller 256.

The controller 256 is configured to generate the second actuation signal when the controller 256 determines that the temperature difference value is greater than the first threshold value. The second actuation signal induces the second actuator 280 to move the damper 278 to the closed operational position. Accordingly, exhaust gases are directed through the venturi member 260 in the first conduit 258 and ambient air is drawn into the flow path 264 of the exhaust gases, such that the ambient air decreases the temperature of the exhaust gases hence decreasing thermal stress of the steam turbine 233.

The controller 256 is further configured to generate the fourth actuation signal when the controller 256 determines that the temperature difference value is less than the second threshold value. The fourth actuation signal induces the second actuator 280 to move the damper 278 to the open operational position. Accordingly, a substantial amount of the exhaust gases is passed through the second conduit 276 directly from the gas turbine 218 to the HRSG 230 without mixing with ambient air in the first conduit 258, such that the temperature of the steam that rolls the steam turbine 233 is increased.

Figure 6:
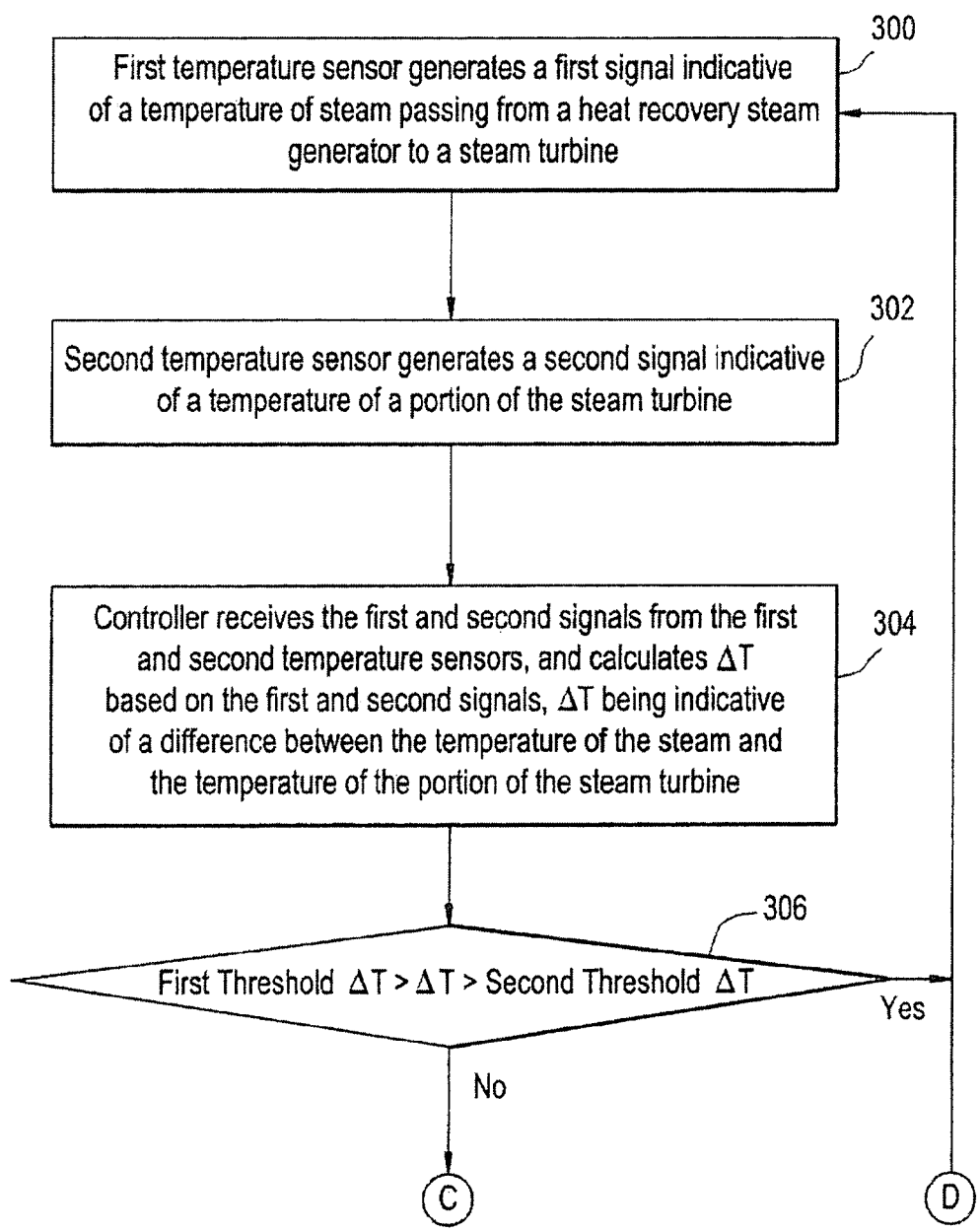
FIGS. 6 and 7 are a flowchart of a method of operating the system of FIG. 5, in accordance with another exemplary embodiment.
Figure 7:
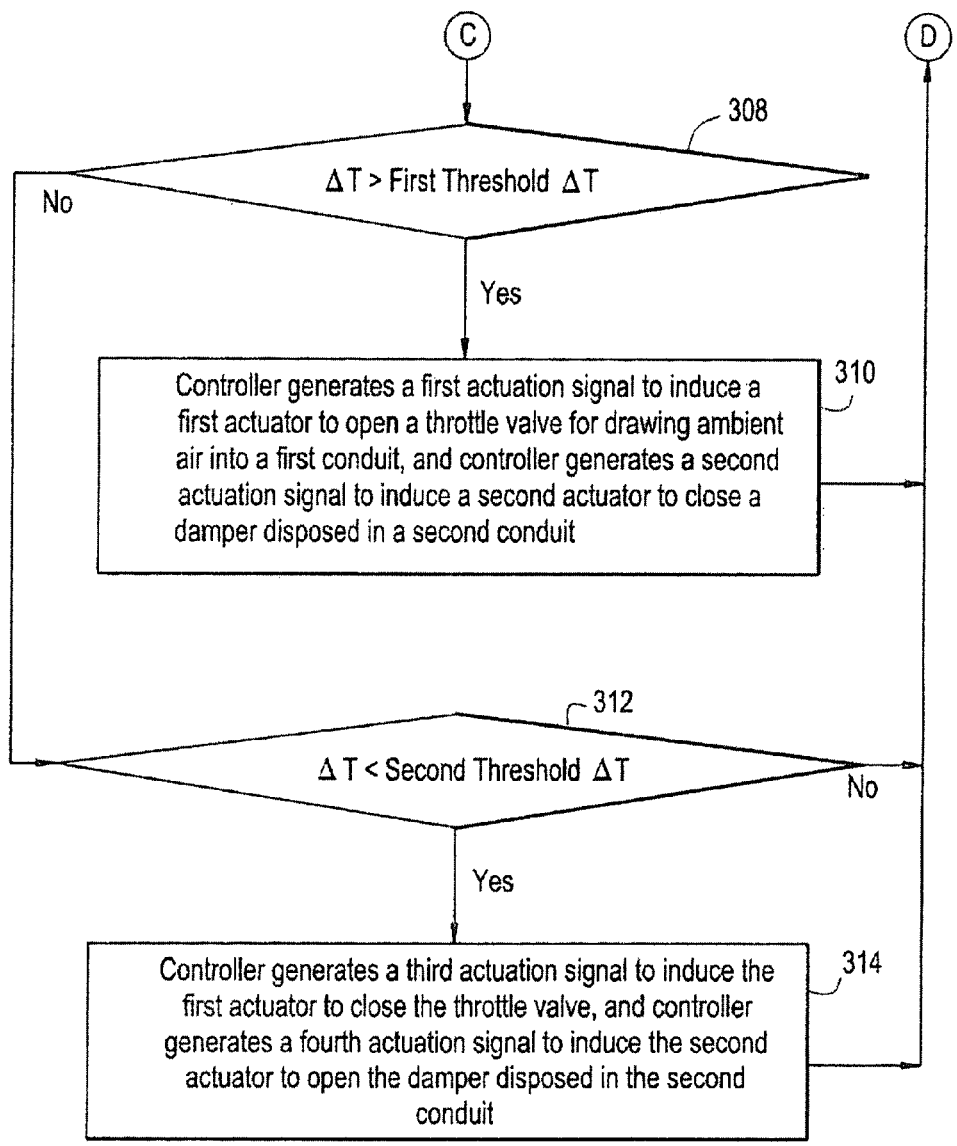

Referring to FIGS. 6 and 7, a flowchart of a method of operating the system 244 of FIG. 5 in accordance with another exemplary embodiment is provided.

At step 300, the first temperature sensor 252 generates a first signal indicative of a temperature of steam passing from the HRSG 230 to the steam turbine 233.

Next at step 302, the second temperature sensor 254 generates a second signal indicative of a temperature of the portion 274 of the steam turbine 233.

Next at step 304, the controller 256 receives the first and second signals respectively from the first and second temperature sensors 252, 254. Further, the controller 256 calculates a temperature difference value based on the first and second signals. The temperature difference value is indicative of a difference between the temperature of the steam and the temperature of the portion 274 of the steam turbine 233.

Next at step 306, the controller 256 determines whether the temperature difference value is less than the first threshold value and greater than the second threshold value. If the value of step 306 equals "yes", then the method returns to step 300. However, if the value of step 306 equals "no", then the method proceeds to step 308.

At step 308, the controller 256 determines whether the temperature difference value is greater than the first threshold value. If the value of step 308 equals "yes", then the method proceeds to step 310.

At step 310, the controller 256 generates a first actuation signal to induce the first actuator 50 to move the throttle valve 48 to the open operational position for drawing ambient air into the first conduit 58. Further, the controller 256 generates the second actuation signal to induce the second actuator 280 to move the damper 278 to the closed operational position. Accordingly, a substantial amount of the exhaust gases are directed through the venturi member 260 in the first conduit 258, such that ambient air is drawn into the flow path 264 and mixed with the exhaust gases for decreasing the temperature of the exhaust gases. In this respect, the temperature of the steam is decreased, and the temperature difference between the steam and the steam turbine 233 does not produce a level of thermal stress on the steam turbine 233 that is greater than a predetermined level of acceptable thermal stress. The method then returns to step 300.

However, if at step 308 the controller 256 determines that the temperature difference value is not greater than the first threshold value, then the method proceeds to step 312.

At step 312, the controller 256 determines whether the temperature difference value is less than the second threshold value. If the value of step 312 equals "no", then the method returns to step 300. However, if the value of step 312 equals "yes", then the method proceeds to step 314.

At step 314, the controller 256 generates a third actuation signal to induce the first actuator 250 to move the throttle valve 248 to the closed operational position for blocking the intake duct 246. The controller 256 further generates a fourth actuation signal to induce the second actuator 280 to move the damper 278 to the open operational position. Accordingly, a substantial amount of the exhaust gases is passed through the second conduit 276 directly from the gas turbine 218 to the HRSG 230 without mixing with ambient air in the first conduit 258, such that the temperature of the steam that rolls the steam turbine 233 is increased. Then, the method returns to step 300.

The exhaust gas attemperating device and methods described herein provide a substantial advantage over other devices and methods. In particular, the exhaust gas attemperating device provides a technical effect of utilizing a venturi member to draw ambient air into a flow path of exhaust gases in a conduit for reducing thermal stress on a steam turbine and decreasing a startup time of a CCPP.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An exhaust gas attemperating device, comprising:
a first conduit configured to receive at least a portion of exhaust gases from a gas turbine; and
a venturi member disposed in the first conduit, the venturi member being co-axially surrounded by the first conduit and defining a flow path therethrough for receiving the exhaust gases in the first conduit, the first conduit and the venturi member having an aperture extending therethrough communicating with the flow path, such that the exhaust gases flowing through the flow path draws ambient air through the aperture into the flow path for reducing a temperature of the exhaust gases flowing through the first conduit.

2. The exhaust gas attemperating device of claim 1 further comprising an intake duct and a throttle valve, the intake duct being in fluid communication with the aperture, the throttle valve being coupled to the intake duct and configured to move between an open operational position and a closed operational position, such that the ambient air passes through the intake duct and the aperture into the flow path when the throttle valve is moved to the open operational position, and the throttle valve blocks the intake duct when the throttle valve is moved to the closed operational position.

3. The exhaust gas attemperating device of claim 2 further comprising a first actuator coupled to the throttle valve, the first actuator being configured to move the throttle valve between the open operational position and the closed operational position.

4. The exhaust gas attemperating device of claim 1 wherein the venturi member includes a stationary portion and a movable portion operably coupled to the stationary portion, the stationary portion being mounted to the first conduit, the movable portion being configured to move between a dilated position and a constricted position, such that the flow path has a first cross-sectional area when the movable portion is moved to the dilated position, and the flow path has a second cross-sectional area when the movable portion is moved to the constricted position, the second cross-sectional area being less than the first cross-sectional area such that more ambient air is drawn into the flow path when the movable portion is moved to the constricted position.

5. The exhaust gas attemperating device of claim 4 further comprising a venturi actuator coupled to the movable portion, the venturi actuator being configured to move the movable portion between the dilated position and the constricted position.

6. A system for controlling a temperature of exhaust gases from a gas turbine, comprising:
- an exhaust gas attemperating device including a first conduit and a venturi member disposed in the first conduit, the first conduit being configured to receive at least a portion of exhaust gases from a gas turbine, the venturi member defining a flow path therethrough for receiving the exhaust gases in the first conduit, the first conduit and the venturi member having an aperture extending therethrough communicating with the flow path, such that the exhaust gases flowing through the flow path draws ambient air through the aperture into the flow path for reducing a temperature of the exhaust gases flowing through the first conduit;
- an intake duct in fluid communication with the aperture;
- a throttle valve coupled to the intake duct, the throttle valve being configured to move between an open operational position and a closed operational position, such that the ambient air passes through the intake duct and the aperture into the flow path when the throttle valve is moved to the open operational position, and the throttle valve blocks the intake duct when the throttle valve is moved to the closed operational position;
- a first actuator coupled to the throttle valve, the first actuator being configured to move the throttle valve between the open operational position and the closed operational position;
- a first temperature sensor configured to generate a first signal indicative of a temperature of steam passing from a heat recovery steam generator to a steam turbine, the heat recovery steam generator being configured to receive the exhaust gases from the gas turbine and generate steam from heat of the exhaust gases;
- a second temperature sensor coupled to a portion of the steam turbine, the second temperature sensor being configured to generate a second signal indicative of a temperature of the portion of the steam turbine; and
- a controller configured to receive the first signal from the first temperature sensor and the second signal from the second temperature sensor, the controller being further configured to generate a temperature difference value indicative of a temperature difference based on the first and second signals, the controller being further configured to induce the first actuator to move the throttle valve to the open operational position when the controller determines that the temperature difference value is greater than a first threshold value, the controller being further configured to induce the first actuator to move the throttle valve to the closed operational position when the controller determines that the temperature difference value is less than a second threshold value, the second threshold value being less than the first threshold value.

7. The system of claim 6 wherein the venturi member includes a stationary portion and a movable portion operably coupled to the stationary portion, the stationary portion being mounted to the first conduit, the movable portion being configured to define the flow path and move between a dilated position and a constricted position, such that the flow path has a first cross-sectional area when the movable portion is moved to the dilated position, and the flow path has a second cross-sectional area when the movable portion is moved to the constricted position, the second cross-sectional area being less than the first cross-sectional area, such that more ambient air is drawn into the flow path when the movable portion is moved to the constricted position.

8. The system of claim 7 further comprising a venturi actuator coupled to the movable portion, the venturi actuator being configured to move the movable portion between the dilated position and the constricted position.

9. The system of claim 8 wherein the controller is configured to induce the venturi actuator to move the movable portion to the constricted position when the controller determines that the temperature difference value is greater than the first threshold value, the controller being further configured to induce the venturi actuator to move the movable portion to the dilated position when the controller determines that the temperature difference value is less than the second threshold value.

10. A power generation system, comprising:
- a gas turbine configured to burn a mixture of fuel and compressed air for producing exhaust gases;
- an exhaust gas attemperating device configured to receive the exhaust gases from the gas turbine, the exhaust gas attemperating device includes a first conduit and a venturi member disposed in the first conduit, the first conduit configured to receive at least a portion of the exhaust gases from the gas turbine, the venturi member being co-axially surrounded by the first conduit and defining a flow path therethrough for receiving the exhaust gases in the first conduit, the first conduit and the venturi member having an aperture extending therethrough communicating with the flow path, such that the exhaust gases flowing through the flow path draws ambient air through the aperture into the flow path for reducing a temperature of the exhaust gases flowing through the first conduit;
- a heat recovery steam generator configured to receive the exhaust gases from the exhaust gas attemperating device and generate steam from heat of the exhaust gases; and
- a steam turbine configured to receive the steam from the heat recovery steam generator and rotate in response to an expansion of the steam.

11. The power generation system of claim 10 further comprising exhaust gas regulation comprising an intake duct and a throttle valve, the intake duct being in fluid communication with the aperture, the throttle valve being coupled to the intake duct and configured to move between an open operational position and a closed operational position, such that the ambient air passes through the intake duct and the aperture into the flow path when the throttle valve is moved to the open operational position, and the throttle valve blocks the intake duct when the throttle valve is moved to the closed operational position.

* * * * *